Figure 1:
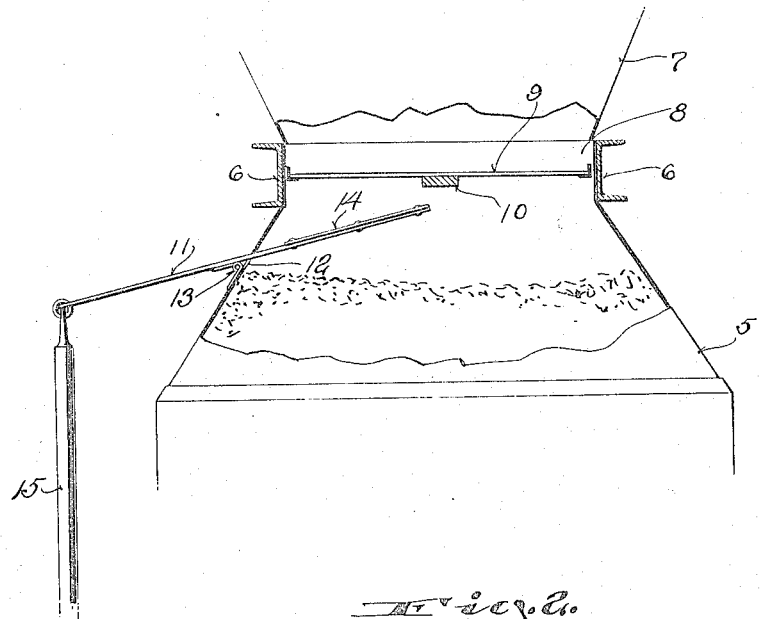

Aug. 12, 1924.

M. R. BUTLER

MATERIAL HANDLING EQUIPMENT

Filed Aug. 25, 1922

1,504,211

Inventor
Morgan R Butler
By Ira M. Jones
Attorneys

Patented Aug. 12, 1924.

1,504,211

UNITED STATES PATENT OFFICE.

MORGAN R. BUTLER, OF WAUKESHA, WISCONSIN.

MATERIAL-HANDLING EQUIPMENT.

Application filed August 25, 1922. Serial No. 584,371.

*To all whom it may concern:*

Be it known that I, MORGAN R. BUTLER, a citizen of the United States, and resident of Waukesha, in the county of Waukesha and State of Wisconsin, have invented new and useful Improvements in Material-Handling Equipments, of which the following is a description, reference being had to the accompanying drawings, which are a part of this specification.

This invention relates to certain new and useful improvements in material handling equipment and refers more particularly to an attachment or appliance for use in connection with material measuring hoppers.

In material measuring hoppers, it has been the custom to close the gate member between the supply bin and measuring hopper when the sound of material passing from the bin to the hopper ceases. However, this in unreliable, as often-times the supply bin empties before the measuring hopper is filled to capacity and, as a result, a true measure is not obtained.

Having this in mind, it is the primary object of the present invention to provide means for indicating when the measuring hopper has been filled to capacity.

Attempts have been made in the past to provide a window to the side of the measuring hopper near the top, constructed of heavy reinforced glass and while this serves its purpose for a while, it soon becomes covered with dirt from the material being measured. Thus it may be stated that the employment of a window absolutely fails to function and in addition the window is, by necessity, in an inconvenient place and alsolutely inaccessible.

With this objection in mind, it is another object of my invention to provide means visible from any position for indicating whether the measuring hopper has been filled to capacity.

A further object of this invention resides in the provision of indicating means of the character described which will indicate when the flow of material has ceased with the measuring hopper but partially filled to thus warn the operator that it is necessary that additional material be placed in the supply bin before closing the gate connecting the bin and hopper and opening the measuring hopper outlet.

This invention has for a still further object to provide a device of the character described which is extremely simple in construction and capable of being applied to measuring hoppers of any type either at the time of their manufacture or to measuring hoppers now in use.

With the above and other objects in view which will appear as the description proceeds, my invention resides in the novel construction, combination and arrangement of parts substantially as hereinafter described and more particularly defined by the appended claims, it being understood that such changes in the precise embodiment of the herein disclosed invention may be made as come within the scope of the claims.

Figure 2:
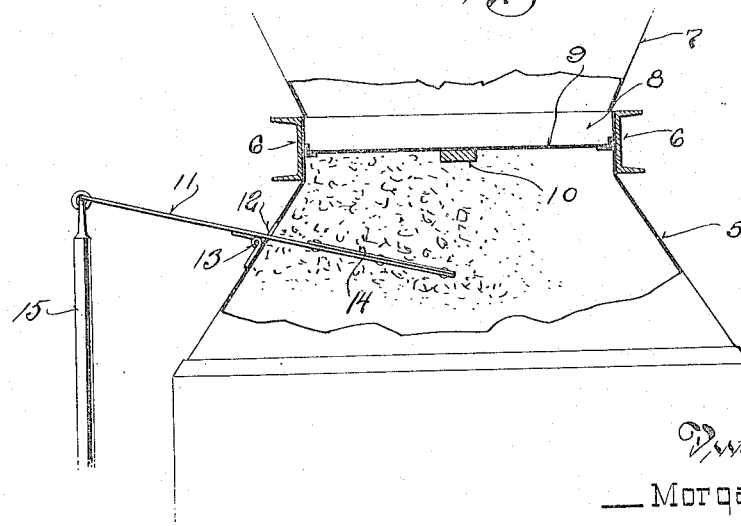

In the accompanying drawings, I have illustrated one complete example of the physical embodiment of my invention constructed according to the best mode I have so far devised for the practical application of the principles thereof, and in which:

Figure 1 is a view, partly in side elevation and partly in section, of the lower and upper portions of a supply bin and a measuring hopper, respectively, the indicating means being in the position occupied when the supply of material is insufficient to fill the measuring hopper to capacity, and Figure 2 is a view similar to Figure 1 illustrating the position of the indicating means when the measuring hopper is filled to capacity and the gate communicating the measuring hopper and the supply bin is closed.

In aggregate mixing hoppers, it is desirable that they are arranged in batteries or pairs, one hopper of each pair measuring sand and the other gravel, and in the accompanying drawing but one hopper 5 of a single pair is illustrated. The hopper is supported or suspended from spaced beams 6 upon which is mounted a supply bin 7 connectible with the measuring hopper by a passageway 8.

The measuring hopper and the supply bin may be of any desired construction and the passageway 8 is adapted to be closed by a slidable gate member 9 which is moved to and from closed position by an operating rod 10. Heretofore it has been customary to move gate member 9 to closed position when the sound of the material passing from bin 7 to the measuring hopper ceases and as often-times supply bin 7 is emptied before the measuring hopper is filled to capacity, the operator closes the gate 9, thinking the measuring hopper to be filled. As a result, the proper measuring of the material is not obtained resulting in possible serious loss.

To overcome this objection, the indicating means illustrated in the drawing is provided which consists of a lever 11 which passes into the interior of the measuring hopper through an opening 12 in one side thereof, said lever being medially pivoted, as at 13, to the wall of the measuring hopper adjacent the opening. Mounted on the inner end of the lever is a plate or paddle 14 and suspended from the outer end thereof is an indicating rod 15 which also functions as a counter-weight, as hereinafter described.

In operation, the material passing from the supply bin to the measuring hopper depresses the inner end of lever 11 and when the sound produced by the material passing from the supply bin to the measuring hopper ceases, the operator before closing gate member 9 notices whether rod 15 is in its upper or lowermost position. If the measuring hopper is filled to capacity, the inner end of lever 11 is depressed and consequently rod 15 elevated as the weight of the material on plate 14 will be greater than the weight of the counter-balance, and the operator may close gate 9 preparatory to emptying the measuring hopper.

In the event the supply bin empties before the measuring hopper is completely filled, the weight of rod 15 will immediately raise the inner end of lever 11 to the position illustrated in Figure 1 thus visually indicating to the operator that the measuring hopper is not filled to capacity.

If desired, rod 15 may be painted any color to facilitate ready visibility, but, however, this is not necessary as the rod extends to a position adjacent the outlet of the measuring hopper.

What I claim as my invention is:

1. In an apparatus of the class described, the combination of a measuring receptacle, a conduit arranged to deliver material into and fill said receptacle, an indicator pivoted to said receptacle, and said indicator having a horizontally arranged portion operable by the passage of material from the conduit to the receptacle to actuate said indicator to indicate whether said receptacle is filled to a predetermined degree.

2. In a device of the character described, the combination with a measuring hopper and a supply bin arranged to discharge therein, of a lever having its inner end adjacent the discharge of the supply bin and its other end positioned exteriorly of the hopper, and means normally urging the inner end of the lever upwardly toward the supply bin discharge, the material entering the hopper from the bin tending to depress the lever inner end against the force of said means, said means raising the lever inner end when the passage of material from the supply bin into the hopper ceases and the volume of material in the hopper is less than a predetermined amount.

3. In a device of the character described, the combination with a measuring hopper and a supply bin arranged to discharge therein, of a lever having its inner end adjacent the discharge of the supply bin and its other end positioned exteriorly of the hopper, and a weight carried by the outer end of the lever to normally urge the inner end thereof toward the supply bin discharge, the material entering the hopper from the supply bin tending to depress the lever inner end against the force of the weight, said weight being sufficient to raise the inner end of the lever when the discharge of material into the hopper from the supply bin stops should the volume of material covering the same be less than a predetermined amount.

In testimony whereof I affix my signature.

MORGAN R. BUTLER.